United States Patent [19]
Cross et al.

[11] 4,114,639
[45] Sep. 19, 1978

[54] LUBRICATED ROTARY VALVE WITH CONCENTRIC SEALING RINGS

[75] Inventors: Michael Ellison Cross; Albert Edward Coles, both of Bath, England

[73] Assignee: Cross Manufacturing Company (1938) Ltd., Bath, England

[21] Appl. No.: 754,442

[22] Filed: Dec. 27, 1976

Related U.S. Application Data

[63] Continuation-in-part of Ser. No. 504,688, Sep. 6, 1974, Pat. No. 4,022,178.

[30] Foreign Application Priority Data

Sep. 7, 1973 [GB] United Kingdom ............... 42105

[51] Int. Cl.² .................. F16K 5/06; F16K 5/22
[52] U.S. Cl. .................. 137/246.22; 123/190 E; 251/170; 251/174; 251/315
[58] Field of Search ............. 137/246–246.23; 251/174, 315, 316, 317; 123/190 R, 190 D, 190 DA, 190 DL, 190 E

[56] References Cited

U.S. PATENT DOCUMENTS

| 1,102,183 | 6/1914 | Augustin et al. | 123/190 E |
|---|---|---|---|
| 2,401,631 | 6/1946 | Gernandt | 123/190 DL |
| 2,745,395 | 5/1956 | Genet | 123/190 E |
| 3,047,265 | 7/1962 | Kaiser | 251/174 |
| 3,504,885 | 4/1970 | Hulsey | 251/317 X |

FOREIGN PATENT DOCUMENTS

| 241,182 | 12/1911 | | 251/333 |
|---|---|---|---|
| 423,474 | 2/1935 | United Kingdom | 123/190 E |

OTHER PUBLICATIONS

Dowson & Higgenson, Elastohydrodynamic Lubrication, Pergamon Press, pp. IX–XII and 190–192 (London, England).

Primary Examiner—Martin P. Schwadron
Assistant Examiner—Richard Gerard
Attorney, Agent, or Firm—Emory L. Groff, Jr.

[57] ABSTRACT

A rotary valve assembly comprising a housing defining a bore and a valve member mounted for rotation therewithin. The housing defines an opening and the valve member has a port which comes into and out of registration as the member rotates. Lubricant is supplied between the two members and sealing means are provided around the opening in the housing to effect a seal with the valve member. The sealing means includes a sealing element disposed in at least one groove formed in the housing parallel to the axis of the bore, the element being urged into contact with the valve member.

6 Claims, 11 Drawing Figures

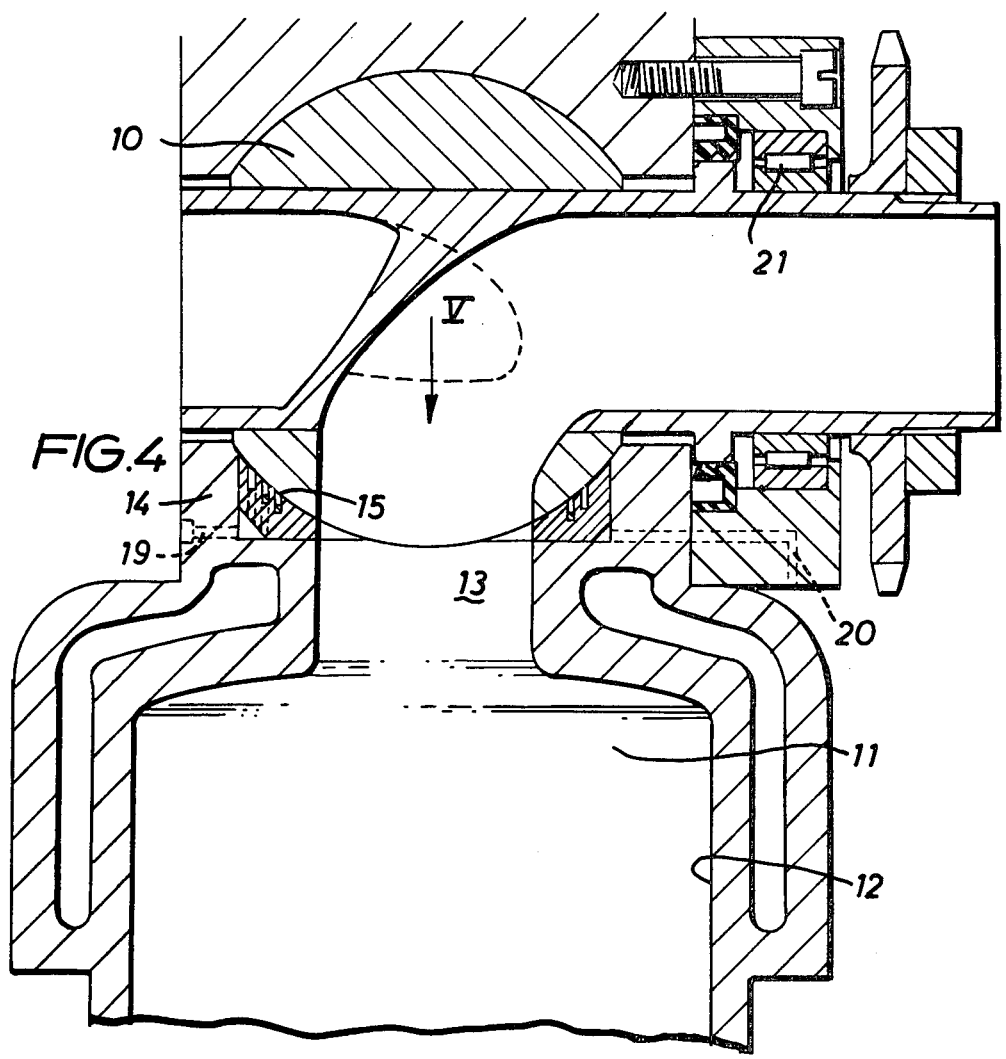
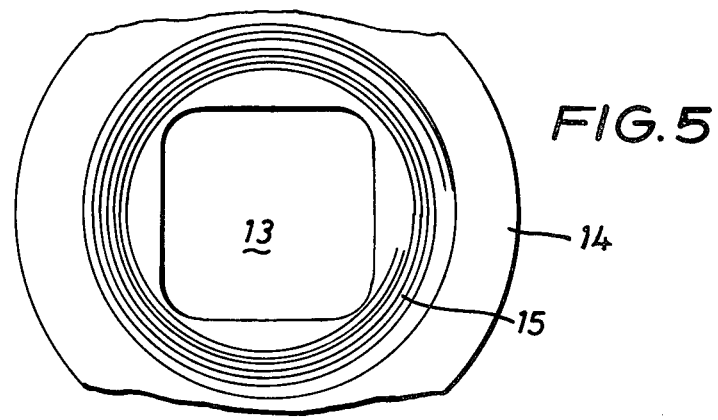

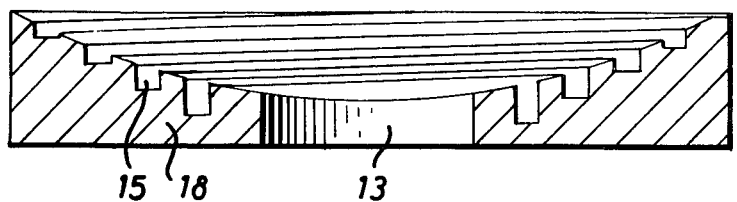
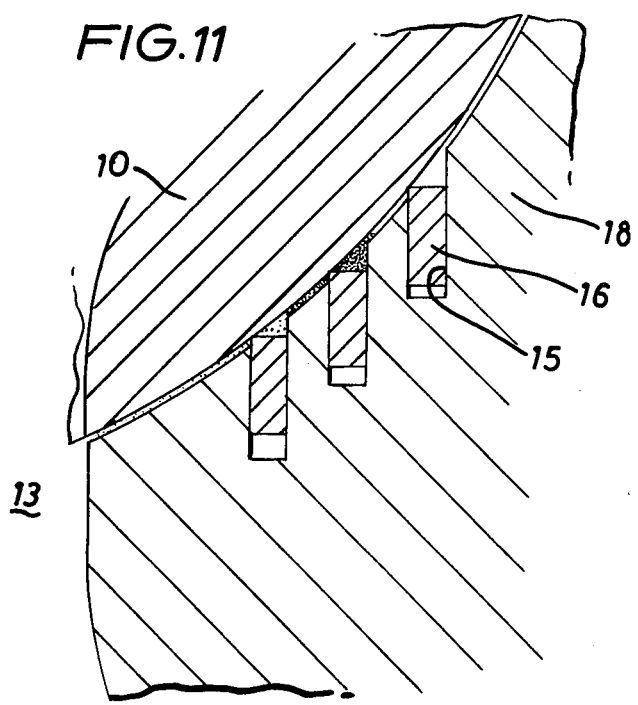

LUBRICATED ROTARY VALVE WITH CONCENTRIC SEALING RINGS

This application is a Continuation-in-Part of our copending Application Ser. No. 504,688, filed Sept. 6, 1974 and now U.S. Pat. No. 4,022,178.

The present invention relates to valves for controlling the flow of gases, and in particular to the lubrication and sealing thereof. The invention is particularly applicable to the lubrication of rotating or sliding surfaces and is especially applicable to rotary valves for controlling the operation of internal combustion engines. However, the invention is also applicable to other valves for controlling steam, jet or other engines, pumps and compressors, all hereinafter referred to as "engines".

In its broadest aspect, this invention provides a rotary valve for controlling the flow of gases, which valve comprises a stationary valve housing having an opening in a face thereof, and a movable valve member mounted for rotation within a bore defined by the housing, the valve member having a face slidable over the said face of the housing and having a port in its said face which comes into and out of communication with the opening, there being means to supply lubricant between the two said faces and sealing means comprising a sealing element disposed in at least one groove formed in the housing substantially parallel to the axis of the bore, the element being urged into contact with the valve member to reduce the oil film thickness between the two said faces in the region of the port and opening when in communication preferably to be from 40 to 5 μ-inches (i.e. approximately from 1.00 to 1.25μm). In the valve of the instant invention at least that part of the valve member containing a port is sphercial, or partly spherical, in shape and the housing containing the said opening is suitably shaped to the conformation of the valve member.

When this invention is applied to a rotary valve for an internal combustion engine, the opening in the housing will communicate with the combustion chamber — normally through a suitable passage in the cylinder head — and two ports will be provided in the valve member, which ports come into and out of communication, in turn, with the opening. One port of the valve member will be associated with the induction system, and the other with the exhaust system. With such a valve, compression ratios of, for example, 10.5 : 1, and bore/stroke ratios of from 1.5 : 1 to 3 :1 can be used successfully, in contrast to conventional poppet valve engines.

The reason that higher compression ratios can be used is that a rotary valve will open, or close, the opening, fully, in as little as 20% of the crankshaft rotation required to open, or close, fully a poppet valve having the same gas flow area. Consequently, the valve overlap at top-dead centre at the end of the exhaust stroke and beginning of the induction stroke can be greatly reduced, if not eliminated altogether. Large valve overlaps give a clear path for unburnt fuel to flow from the inlet port to the exhaust port of an engine, thus leading to inefficiency, as well as high atmospheric pollution. A further reason is that in a poppet valve engine, the exhaust valve runs very hot, and causes pre-ignition if either low octane fuels or high compression ratios are used. On the other hand, a rotary valve runs very much cooler, partly because the face presented to the combustion chamber is constantly moving, and partly because of the cooling effect of the lubrication, thus eliminating pre-ignition with low octane fuels and high compression ratios.

A rotary valve constructed in accordance with this invention has effective sealing for the valve port as it opens into the combustion chamber, such sealing being adequate to allow for high bearing pressures, for example of from 500 to 1000 p.s.i. The very thin film of lubricant should be as small as possible for the loading on the valve, and the sealing means serves to prevent lubricant being carried in a relatively thick layer on the valve member surface past the opening in the housing. This has the advantages that a very thin film of lubricant follows the valve member temperature more closely than that of the gas passing through the valve, and therefore does not become materially oxidised or carbonised, and that the lubricant film is so thin as to be physically attracted by the surface irregularities of the valve and is thus not liable to be scraped off into the combustion chamber when passing the opening. The precise minimum thickness is within the range of surface asperity heights, and thus the film falls within the theory of elastohydrodynamic lubrication. According to this theory, postulated by Dowson and Higgenson (see "Elastohydrodynamic Lubrication", published by Pergamon Press, 1 Bread Street Place, London E.C.2. England, pages ix to xii and 190 to 192), the actual minimum lubricant film thickness is a function of the valve member diameter, and can be calculated from a dimensionless film thickness parameter H. The minimum value of the parameter H can be calculated from the formula:

$$H_{min} = 2.65(U^{0.70} \times G^{0.54})/W^{0.13},$$

wherein:
$H$ = dimensionless oil film thickness parameter = $h/R$
$W = w/E'R$ = dimensionless load parameter
$U = \xi o^u/E'R$ = dimensionless speed parameter
$G = \alpha E'$ = dimensionless materials parameter
$h$ = actual film thickness
$R$ = radius of rotor
$w$ = load/unit width
$E'$ = Youngs modulus of housing material in the region of the thin film
$u$ = sliding velocity between rotor and housing
$\xi o$ = viscosity of lubricant
$\alpha$ = pressure exponent of viscosity to take account of changes in viscosity of the lubricant caused by the high pressures prevailing.

For diameters of valve members which are likely to be employed, as well as the materials and lubricants, it is found that the minimum oil film thickness is of the order of 40 to 50 μ in (i.e. 1.00 to 1.25 μm).

The surface areas found necessary for this theory to apply may be determined in practice by assuming the reaction force from the combustion within the engine cylinder to be evenly distributed over the entire sealing area. The value of the force then can be expressed as a nominal projected surface pressure, to enable a practical rule of loading to cover a wide range of variable temperatures and port areas. As previously mentioned, a practical pressure loading is within the range of from 500 to 1000 p.s.i.

In the invention there is provided one or more sealing elements around the opening in the said face of the valve housing, for sealing against the valve member. In a similar way, sealing elements could instead be provided around the port in the said face of the valve member, for sealing against the valve housing.

In either case in which sealing elements are provided, each element may comprise a volute or spiral groove formed in the said face, or in an insert fitted into the said face. Instead of a single groove, a series of concentric grooves may be formed in the said face or in an insert fitted into the said face. The groove, grooves, or volute, of the instant invention, are parallel, or nearly parallel, to the vertical axis of the bore of the said opening; thus where the opening leads into the combustion chamber of an engine cylinder, the groove, grooves, or volute will be parallel, or nearly parallel, to the centre line of the cylinder bore; that is to say that in engines of conventional design the groove, grooves, or volute will be vertical, or only slightly angled from the vertical. Preferably the grooves are substantially rectilinear in cross section; obviously, where the top of the groove meets the spherical surface of the valve member face it will conform to the configuration of the face. Although the sealing may be accomplished simply by the effect of the upstanding parts of the element between the grooves, it is preferred for there to be one or more sealing strips fitted into the or each groove to effect the seal, and such strips may be resiliently urged into engagement with the face against which it is to effect the seal, as necessary to form an effective seal. In the case of the spherical valve member of the instant invention, such a strip is advantageously co-planar when relaxed, and is deformed from its relaxed state when the valve member is fitted into the housing; this deformation can provide the resilient bias on the strip.

In the form of the invention employing a series of grooves concentrically arranged about the opening to the combustion chamber, since the grooves are substantially vertical to the centre line of the cylinder bore and parallel thereto, they can be fitted with sealing rings, arranged to bed on the face of the valve member, which are of truly circular form with very small gaps; the rings may be spring influenced into sealing contact with the face of the valve member, for example by means of extraneous springs located in pockets beneath the ring grooves. The grooves and rings are, preferably, rectilinear in section provided always that the tops of the grooves conform to the curvature of the valve member; it will be appreciated that sealing contact is not over the whole width of the rings yet, whilst the sealing area of the rings is reduced, the sealing pressure per square inch is increased.

With the volute form of grooving, the volute coil, when wound in a flat plane, provides its own spring pressure due to the coils being deflected as the spherical valve member beds on its seating; if desired, sealing contact of the volute coil may be enhanced by the provision of extraneous springing located, e.g. beneath the coil.

The sealing arrangements using volutes or spirals are of advantage with very high cyclic cylinder pressures. A volute or spiral seal provides a small but continuous leak path. The effect of this arrangement is to develop a viscous pressure drop along the entire length of the seal. Since the filling time of the leakage path is only related to the net pressure over its ends, the pressure differential develops virtually instantaneously over each convolution. Thus the sealing force related to the pressure differential over each turn of the seal follows the cyclic rise in pressure in the cylinder very closely. Since the volute seal provides a continuous leak path, this can be used to provide the motive force to eject lubricating oil from the seal groove; for example, the outer convolution of the volute groove may be connected to a lubricant duct and conveyed back to an oil reservoir, e.g. an oil sump, thus allowing recirculation constantly of oil for re-use. Since the volute seal has the advantage of reducing the lag in pressure rise between the sealing turns, where a sealing strip is employed the elasticity of the strip material may be used to load the seal on the rotor during starting and on those parts of the cycle where the cylinder pressure is too low to provide sufficient sealing effect.

The advantages in terms of surface loading offered by a continuous sealing strip located within a volute groove, over a series of concentric seals, are significant. Over 20% of the contact area in either type is derived from gas forces acting within the sealed volume, the remainder from elastic load in the sealing strip itself; the force, acting upon the back of the sealing strip provides most of the force needed to maintain a dynamic seal. However, as is known by those versed in the art, the surface area of a seal acting against its mating surface, at any instant of time, represents only a small proportion of the total sealing area of the seal, owing to dynamic deflections of the sealing strip during the operating cycle of pressure pulsation. As will be appreciated, this effect means that it is more nearly the instantaneous differential pressure value over each convolution of the seal than the absolute gas force at the back of the sealing strip which must be determined in order to be able to calculate a table of approximate instantaneous seal mating forces.

Now, for the case of a pair of concentric sealing rings, the instantaneous differential, or pressure drop at any point in the cycle, is determined by the rate of leakage past the first element and the size of the clearance volume between it and the second element. Thus the peak cyclic pressure between the first and second element must lag in time from the peak cyclic pressure in the working chamber, due to the time necessary for the volume between the elements to reach pressure stability with the sealed volume. Thus the inter-seal volume, which is principally determined by mechanical clearance and strength considerations, becomes a deciding factor which determines the pulsation time lag and hence the instantaneous value of the differential pressure drop acting over the first sealing ring; from this it may be seen that the instantaneous loading value between the seal and its mating surface is related directly to the inter-ring volume, which is largely uncontrollable below minima set by other design features. This means that materials and lubrication of seal elements must be chosen to provide surface load carrying capabilities in excess of those generated by the sliding movement of the faces. In circumstances of minimum lubricant availability, such as those mentioned above for a rotary valve, many material/lubricant combinations may not be readily available in materials which are otherwise compatible with strength, thermal and environmental conditions of the internal combustion cycle. However, the time lag between maximum gas pressure over each convolution of the volute seal is, in practical terms, entirely within the control of the designer since it may be reduced to any desired value by increasing the calculated leakage path area between each pair of seal convolutions. Thus, as discussed in the foregoing, the net instantaneous pressure drop over each sealing convolution and hence the instantaneous sealing force upon the seal, may be reduced to a level acceptable to the load which may be carried safely between the sealing strip and its mating surface. In practice it may be desirable to allow a lower pressure drop over the first convolution than over subsequent convolutions since the first convolution will generally operate at the highest temperature and thus be more sensitive to lubricant failure. In the invention, this may be arranged by providing a leakage path of reducing cross-sectional area along its length. In this way the viscous pressure drop in the fluid emptying along the leakage path can be varied from one convolution to another, and the outer, cooler, convolution can carry higher sealing forces than would be permissible for the first convolution. At the same time, the total loss of working fluid may be held at a low level by a sufficient number of seal convolutions.

The lubricant is conveniently supplied to between the two faces of the valve by porous or capillary feed means disposed in the valve housing. One way of effecting this is to arrange porous plugs located snugly in holes or taps in the valve housing, such that lubricant supplied to the plugs can not substantially flow out between the two said faces, and yet can lubricate the valve member. The lubricant may be supplied to the porous or capillary means by gravitation, such as from a reservoir located thereabove, or by capillarity from an oil source, or by a combination of these methods; where porous plugs are used they can be graded for porosity to control the flow of lubricant oil. Alternatively, or in addition, lubricant may be delivered by pumping. The important function of using a porous or capillary means is to avoid undesirable pressure fluctuations upstream thereof, which could be generated from cyclic gas pressure forces generated in the working chamber. By adjusting a steady pressure, or head, of oil upstream, fine control of flow rates may be achieved in a simple manner without the need to resort to complicating devices.

When the rotary valve is fitted to an internal combustion engine, the supply of oil conveniently may be taken from the main engine oil pump; for example by way of a continuous bleed from the high pressure system. A variable local relief valve may be provided suitably between the oil supply source and the porous or capillary means, so that the flow may be regulated. For example, the local relief valve may be arranged to be adjusted automatically on the operating conditions of the engine, for instance, its speed and/or its loading. However the lubrication be achieved, it is most important that the feed is arranged to give a thin but adequate film of oil on the said faces of the valve, and that lubricant does not leak into the opening in the housing to any significant extent.

A particularly suitable manner of feeding lubricant to the faces of the valve is by supplying lubricant to plugs made of a porous metal, such as sintered bronze. However, other materials may be used.

The invention is further illustrated, by way of example only, with reference to the accompanying drawings, in which:

FIG. 4 is a longitudinal section of part of an engine and spherical rotary valve having a volute seal;

FIG. 5 is a view of the volute seal, taken in the direction of arrow V on FIG. 4 but with valve member removed;

FIG. 8 is a section of a volute insert;

FIG. 11 is a detail showing the provision of an oil leak path in a volute seal in the valve housing.

Figure 1:
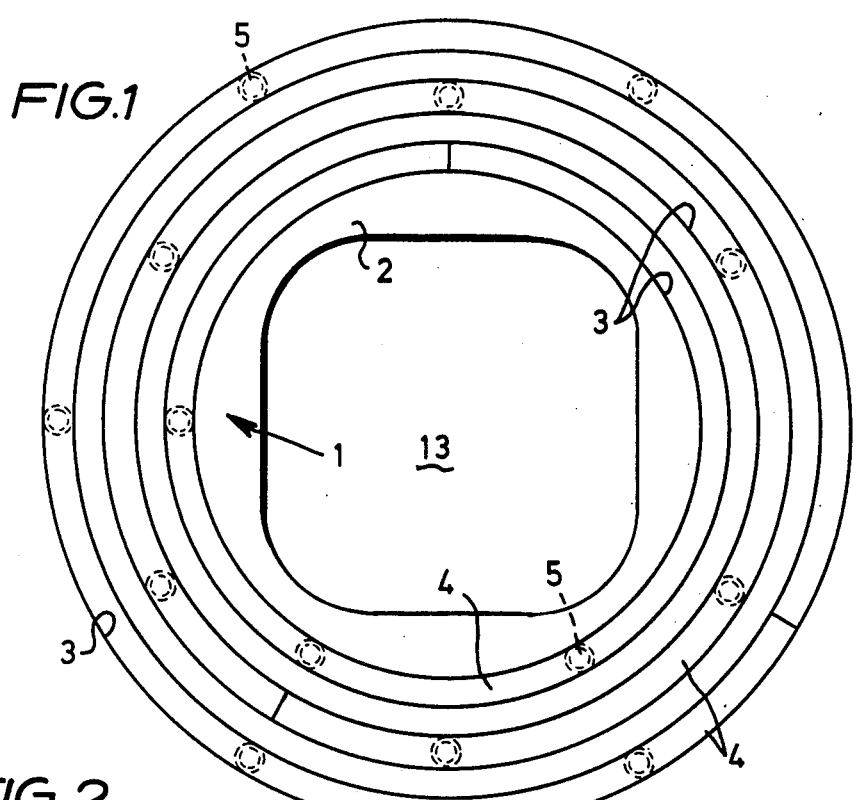
FIG. 1 is a diagrammatic plan view showing sealing rings located in concentric grooves.
Figure 2:
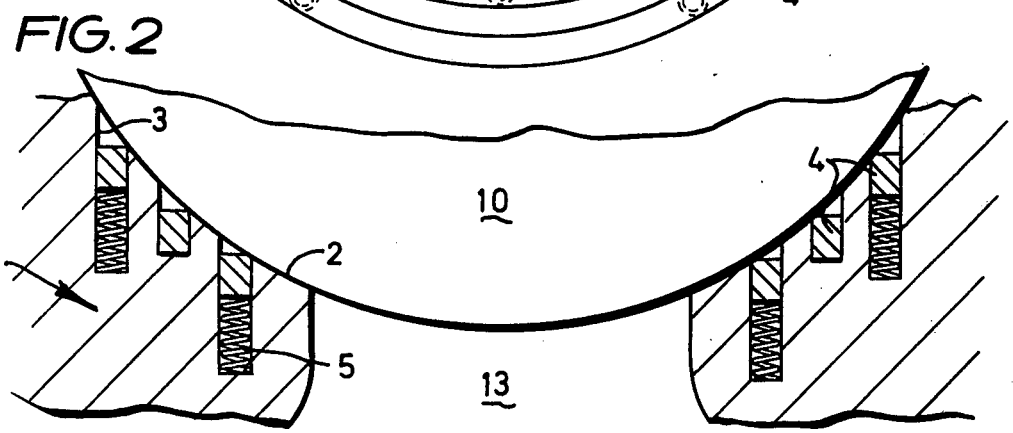
FIG. 2 is a vertical sectional projection of FIG. 1.
Figure 3:
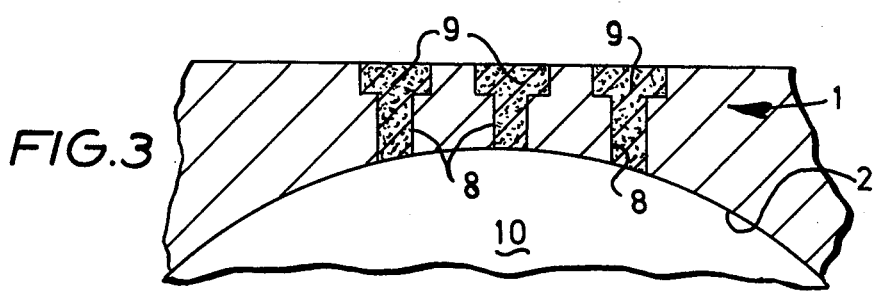
FIG. 3 is a detail showing the use of porous plugs.

Referring to FIGS. 1, 2 and 3 of the drawings, there is shown a housing 1 for a spherical, or part spherical, valve member having an opening 13 into the combustion chamber of an internal combustion engine. The face 2 of the housing 1 is shaped to the countour of the spherical, or part spherical, valve member and is provided with concentric grooves 3, vertically arranged parallel to the centre line of the opening 13, which leads into the combustion chamber of an engine cylinder. Located in the grooves 3 are circular sealing rings 4 urgea upwardly against the face of the valve member (not shown) by springs 5 located in pockets. The valve housing may be bored, or tapped, as shown at 8 and provided with porous plugs 9 through which lubricant may be supplied to the face of the valve member.

Referring now to FIGS. 4 and 5, there is shown a spherical, or part spherical, valve member 10, provided with suitable ports. The valve housing 14 is in general shaped in a corresponding manner, so that the valve member may rotate therewithin, the housing 14 having an opening 13 into the combustion chamber 11 of an internal combustion engine. Rotation of the valve member in turn allows the admission of combustible mixture into, and exhaust of combustion products from the combustion chamber 11. The valve housing 14, around the opening 13, is recessed, and fitted therewithin is a seal insert 18 having grooves 15 facing the valve member 10. As shown in FIG. 2, the grooves may be formed in the face of the housing itself, instead of in an insert such as 18. The grooves may be in the form of concentric rings, but as shown in FIG. 5 are in the form of a volute or spiral. Lubricant may be supplied to the valve member via a passage 19, and lubricant removed by the seal may be drained through a passage 20.

Figure 6:
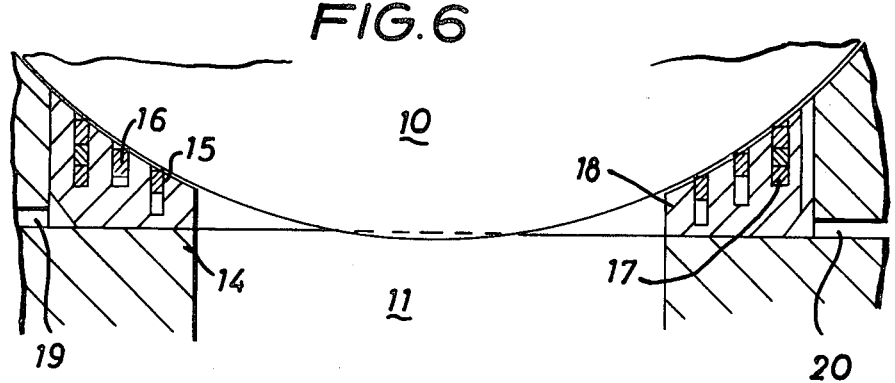
FIG. 6 is a part sectional view showing one embodiment of the volute seal.

FIG. 6 shows an alternative form of seal, in which a continuous seal strip 16 is located in the spiral groove 15, which strip 16 bears on the spherical face of the rotary valve member. Packing strips 17 are provided below the seal strip 16 as necessary to adjust the height of the seal strip so that it upstands above the face of the insert 18 by an appropriate amount.

Figure 7:
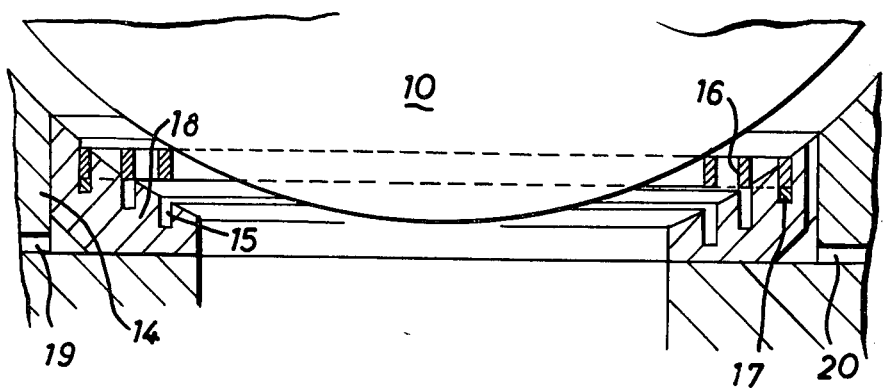
FIG. 7 is a part sectional view showing a modified arrangement of a volute seal.

The seal strip 16 may be resilient, and when relaxed, generally co-planar, as shown in FIG. 7. Then, as the spherical valve member is pressed into position closely adjacent the insert 18, the seal strip will be resiliently deformed — to take up the shape shown in FIG. 6. If desired spring pressure may be applied beneath the seal strip 16 to urge it into contact with the face of the valve member. Again, packing strips 17 may be provided as necessary, and in particular, to support the outer turns of the strip.

FIG. 8 shows a further form of spiral groove 15 in an insert 18, in which the depth of the groove varies along its length, from a maximum nearest the centre (i.e. opening 13) to a minimum at its other end. Such a groove provides a spiral or leakage path, serving both to allow the spherical valve member to be sealed against the insert, and to drain removed oil.

Figure 9:
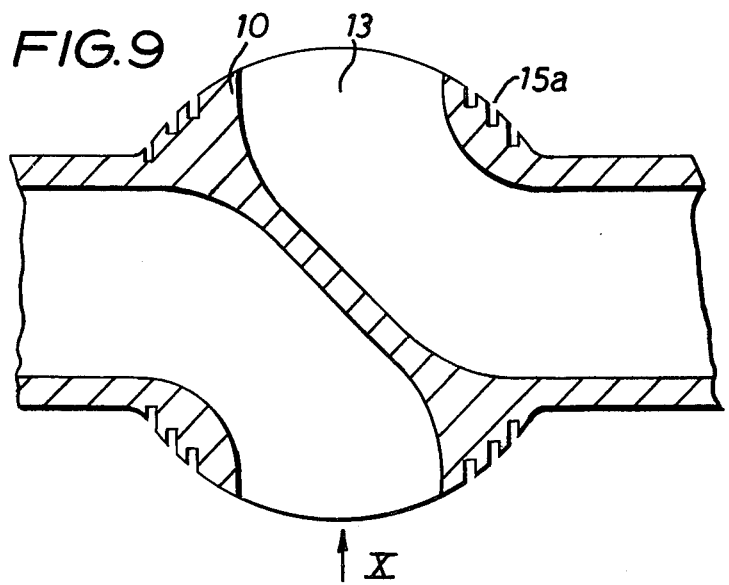
FIG. 9 is a sectional view of a spherical valve member having a volute groove serving as a seal.
Figure 10:
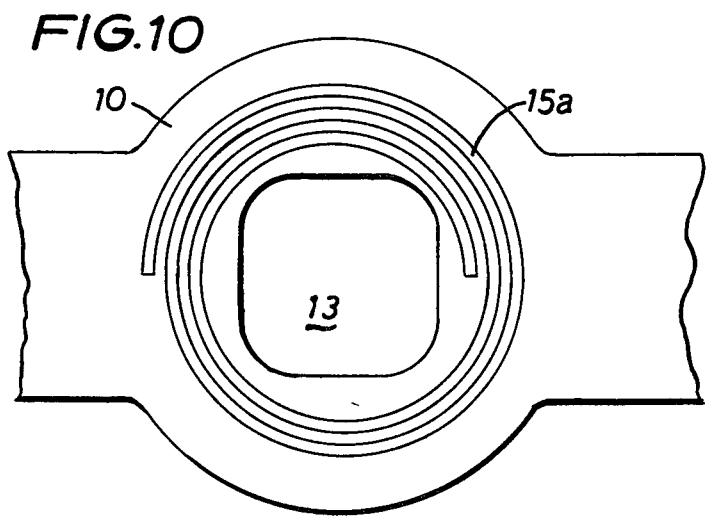
FIG. 10 is a view of the valve member of FIG. 9, taken in the direction of arrow X in FIG. 9.

FIGS. 9 and 10 together show an alternative form of seal, in which sealing grooves 15a are provided in the valve member 10 around each of its ports 13. The function of the sealing grooves 15a here is just the same as in the above discussed embodiments and again these grooves may be in the form of concentric rings, or a continuous spiral, as shown. With either arrangement, the valve housing in the region of its opening into the combustion chamber should be smooth.

FIG. 11 is an enlarged view of an insert 18 fitted in a valve housing, the insert having a groove 15 in the form of a volute, and there being a sealing strip 16 fitted therein. The sealing strip is formed as shown, to provide a relatively sharp edge bearing against the valve member, both to effect a seal and to remove excess lubricant, the removed lubricant being able to collect as shown and then drain away.

What is claimed is:

1. A rotary valve for controlling the flow of gases which rotary valve comprises a stationary valve housing defining an opening in the face thereof, leading to a combustion chamber and a movable member mounted for rotation in a bore defined by the said housing, said valve member having a face slidable over the face of the said housing and defining a port located in a part of the said face having a spherical conformation, which port is arranged to come into and out of communication with the said opening, means to supply lubricant between the two said faces, sealing means disposed to reduce the oil film thickness between the two said faces in the region of the port and opening when in communication to be in the region of from 40 to 50 $\mu$-inches, the said sealing means comprising sealing rings each located in one of a series of grooves of successively decreasing diameter concentrically arranged about the opening in the face of the valve housing which grooves are formed substantially parallel to the axis of the said opening and means to urge the sealing rings resiliently against the face of the movable valve member.

2. A rotary valve according to claim 1, characterised in that the said sealing means is located in an insert fitted into the face of the said valve housing.

3. A rotary valve according to claim 1, characterised in that each said groove is substantially rectilinear in cross-section but curved at its outlet to conform to the spherical configuration of the valve port.

4. A rotary valve as claimed in claim 3 further characterised in that the said rings are rectilinear in cross-section.

5. A rotary valve as claimed in claim 1, characterised in that the said sealing rings are resiliently urged against the face of the movable member by springs located in pockets below and in communication with the said concentric grooves.

6. A rotary valve as claimed in claim 1, characterised in that the axis of the opening is coaxial with the axis of the said concentric grooves.

* * * * *